(12) United States Patent
Lian et al.

(10) Patent No.: US 8,752,004 B2
(45) Date of Patent: Jun. 10, 2014

(54) SYSTEM AND A METHOD FOR GENERATING A DOMAIN-SPECIFIC SOFTWARE SOLUTION

(75) Inventors: Li Lian, Shanghai (CN); Xavier Ceugniet, Le Rouret (FR)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 13/248,534

(22) Filed: Sep. 29, 2011

(65) Prior Publication Data

US 2012/0084748 A1 Apr. 5, 2012

(30) Foreign Application Priority Data

Oct. 1, 2010 (EP) .................................. 10306074

(51) Int. Cl.
*G06F 17/00* (2006.01)
*G06F 17/20* (2006.01)
*G06F 17/25* (2006.01)
*G06F 17/28* (2006.01)
*G06F 3/00* (2006.01)
*G06F 9/44* (2006.01)
*G06F 9/45* (2006.01)

(52) U.S. Cl.
USPC ........... 717/104; 715/206; 715/760; 717/105; 717/120; 717/140

(58) Field of Classification Search
CPC ........... G06F 9/44; G06F 9/5061; G06F 8/10; G06F 8/20; G06F 8/30; G06F 8/34; G06F 8/35; G06F 8/36; G06F 8/38; G06F 8/71; G06F 17/3089
See application file for complete search history.

(56) References Cited

U.S. PATENT DOCUMENTS

| 6,349,404 | B1 | 2/2002 | Moore et al. | |
| 7,131,066 | B1 * | 10/2006 | Birsan et al. | 715/206 |
| 7,219,327 | B1 * | 5/2007 | Jacobs et al. | 717/104 |

(Continued)

FOREIGN PATENT DOCUMENTS

KR 2008052987 A 6/2008

OTHER PUBLICATIONS

Ueli Wahli et al., Building SOA Solutions Using the Rational SDP, Apr. 2007, [Retrieved on Mar. 12, 2013]. Retrieved from the internet: <URL: http://www.redbooks.ibm.com/redbooks/pdfs/sg247356.pdf> 636 pp. 1-610.*

(Continued)

*Primary Examiner* — Don Wong
*Assistant Examiner* — Anibal Rivera
(74) *Attorney, Agent, or Firm* — Charles L. Moore; Moore & Van Allen PLLC

(57) ABSTRACT

A method for generating a domain-specific software solution may include receiving a request for a solution model to accomplish one or more tasks. A domain model may be selected in response to the request for the solution model. The solution model may be configured based on the selected domain model. The solution model may be configured by selecting a set of candidate technical assets for each task of the solution model. The solution model may also be configured by determining for each candidate technical asset if the one or more requirements of the task of the solution model are satisfiable by the candidate technical asset. The solution model may be further configured by selecting a technical asset for each task to be included in a solution implementation.

20 Claims, 8 Drawing Sheets

(56) References Cited

U.S. PATENT DOCUMENTS

| | | | |
|---|---|---|---|
| 8,533,660 B2* | 9/2013 | Mehr et al. | 717/104 |
| 2003/0046282 A1* | 3/2003 | Carlson et al. | 707/6 |
| 2005/0080640 A1 | 4/2005 | Bhaskaran et al. | |
| 2005/0091093 A1* | 4/2005 | Bhaskaran et al. | 705/7 |
| 2006/0190944 A1* | 8/2006 | Moon et al. | 718/104 |
| 2006/0230382 A1 | 10/2006 | Moulckers | |
| 2007/0180424 A1* | 8/2007 | Kazakov et al. | 717/104 |
| 2007/0239717 A1 | 10/2007 | Thrash et al. | |
| 2008/0195509 A1 | 8/2008 | Bellacicco et al. | |
| 2008/0244517 A1* | 10/2008 | Rostoker | 717/120 |
| 2009/0138293 A1 | 5/2009 | Lane et al. | |
| 2009/0172632 A1* | 7/2009 | Kashai et al. | 717/104 |
| 2009/0172696 A1 | 7/2009 | Meliksetian et al. | |
| 2010/0011337 A1* | 1/2010 | Young et al. | 717/104 |
| 2010/0037202 A1* | 2/2010 | Schubert | 717/105 |
| 2010/0088685 A1* | 4/2010 | Ahmed et al. | 717/140 |
| 2010/0293484 A1* | 11/2010 | Stanhope et al. | 715/760 |
| 2011/0295763 A1* | 12/2011 | Chen et al. | 705/348 |

OTHER PUBLICATIONS

Jacques Meekel et al., From Domain Models to Architecture Frameworks, 1997, [Retrieved on Dec. 9, 2013]. Retrieved from the internet: <URL: http://www.cs.virginia.edu/people/faculty/pdfs/p75-meekel.pdf> 6 pp. 75-80.*

Wu, Budan, et al., A Modeling Approach for Service-Oriented Application Based on Extensive Reuse, 2008 IEEE International Conference on Web Services, pp. 754-757.

Wu, Budan, et al., Service-Oriented Modeling: An Extensive Reuse Method, 2008 Annual IEEE International Computer Software and Applications Conference, pp. 607-612.

Wu, Yan, et al., Construction of Ontology-Based Software Repositories by Text Mining, ICCS 2007, Part III, LNCS 4489, pp. 790-797.

* cited by examiner

SYSTEM AND A METHOD FOR GENERATING A DOMAIN-SPECIFIC SOFTWARE SOLUTION

CROSS-REFERENCE TO RELATED APPLICATION

The present application claims benefit of priority to European Application No. EP10306074.5 filed on Oct. 1, 2010, the contents of which are hereby incorporated by reference herein in its entirety.

FIELD OF THE INVENTION

The invention generally relates to computer systems and in particular to a system and a method for generating a domain specific software solution.

BACKGROUND OF THE INVENTION

Existing systems for generating software solution, such as planning and scheduling systems, comprises a set of components to assist the creation and communication of strategic, tactical or operational plans for a business organization. These components achieve a number of tasks defined by a software solution model, such as for example data checking, forecasting, feasibility analysis, optimization, simulation, visualization, what-if analysis, reporting and connection to organization information system.

Such solution generation systems often require important human interactions to specify, to develop and to integrate a software solution from the solution model, such as a planning solution. In particular, the development of efficient optimization models or analytic models often requires strong expertise in both the business domain and operational research. Further, very few experts of this type are available.

Vertical approaches target an industry-specific class of problems and can be used to overcome this limit of existing solution generation systems, like for instance IBM ILOG PPO and IBM ILOG TPO. They offer some limited levels of solution customization to adapt to specific needs. The components of such systems have also limited capabilities to cover task requirements that have not been identified beforehand, during the development of the vertical solution. They use in particular optimization models that cannot be easily extended. Consequently, vertical approaches only target well-defined classes of problems, which variability of solution requirements can be simply addressed for instance by parameter settings or configuration business rules.

Further, existing solution generation systems based on vertical approaches only provide full solutions whereas it is sometimes needed to only provide some services to be integrated in an existing system.

Another known approach relies on delivering industry frameworks containing standard-based model, processes or services for various industries as government, insurance, finance or health care. When focusing on the specific tasks to create the content of strategic, tactical or operational plans for various industries, standards are lacking.

For each domain in specific industries, there exists many scheduling and planning solutions that are already built with technical assets or components, such as optimization models, sets of business rules, widgets for user interface, data connectors to various data sources, etc. However, existing systems for generating domain specific software solution do not allow to generate a new solution model from technical assets or components pre-built in another solution model.

There is accordingly a need for a method and a system capable of generating a domain specific software solution from reusable technical assets.

SUMMARY OF THE INVENTION

The solution generation system according to the invention allows indexation of technical assets with respect to the task (s) it implements and the requirements it covers. Tasks and requirements are defined in a domain model that captures knowledge data about an industry-specific category of solutions. It is another advantage of the invention to configure a solution model by instantiating concepts and tasks of a domain model. The solution generation system of the invention is also adapted to automatically retrieve technical assets eligible to implement tasks configured in the solution model.

By modelling asset descriptor as a way to index technical assets with respect to structured definition of a domain model and by allowing the configuration of solution models based on these domain models the invention allows the automatic selection of the eligible technical assets to implement a solution. With the invention the process of reusing assets does no longer rely on informal and partial classification of assets like with tags or keywords.

The formalization of the eligibility of a technical asset with respect to tasks configured in a solution model gives the right level of information to a non-technical expert about which part of the functional requirements are covered by the asset and which part is missing.

Moreover by exposing to experts only the knowledge of a domain, the solution generation system allows them to specify their solution model, in a way that hides the technical knowledge required to link reusable technical assets.

According to one aspect of the invention, a method for generating a domain-specific software solution may include providing a plurality of domain models stored in an asset repository. Each domain model may include a set of task classes each associated with one or more respective tasks and a set of requirement classes each defining one or more requirements associated with the respective tasks. The method may also include providing a plurality of technical assets associated with each domain model. Each technical asset may be associated with an asset descriptor identifying at least one task class and at least one requirement class associated with the at least one task class of the associated domain model. The method may also include providing a solution model for a given domain model among the domain models. The solution model may include the set of task classes of the given domain model and the set of requirement classes associated with the set of task classes in the given domain model. For each task class in the solution model, candidate technical assets associated with the given domain model may be preselected if the task class or a parent class of the task class is identified in a respective asset descriptor associated with each technical asset. For each candidate technical asset preselected for a task class, at least one requirements set identifying one or more requirements may be determined based on conditions related to the one or more requirements associated with the task class in the asset descriptor and the one or more requirements associated with the task in the solution model. The method may additionally include selecting one of the candidate technical assets among the candidate technical assets preselected for a task of the solution model to implement the task based on the at least one requirements set determined for each of the candidate technical assets.

According to another aspect of the invention, a method for generating a domain-specific software solution may include receiving, by a processor, a request for a solution model to accomplish one or more tasks. The method may also include selecting, by the processor, a domain model in response to the request for the solution model. The method may additionally include configuring, by the processor, the solution model based on the selected domain mode. Configuring the solution model may include selecting a set of candidate technical assets for each task of the solution model, wherein each task has one or more requirements. Configuring the solution model may also include determining for each candidate technical asset of the set of candidate technical assets for each task if the one or more requirements of the task of the solution model are satisfiable by the candidate technical asset. Configuring the solution model may further include selecting a technical asset from the set of candidate technical assets for each task to be included in a solution implementation in response to the candidate technical asset satisfying the one or more requirements of the task of the solution model. The method may additionally include implementing, by the processor, the solution in response to selecting the technical assets for each task of the solution model.

According to another aspect of the invention, a system for generating a domain-specific software solution may include a processor and a repository for storing a plurality of domain models associated with the processor. The system may also include a solution model configurator operable on the processor. The solution model configurator configures a solution model based on a selected domain model. The system may also include a plurality of reusable technical assets stored on the repository. Each reusable technical asset may be adapted to satisfy one or more requirements of an associated task of the domain model. The system may also include a solution generation unit to select reusable technical assets from the plurality of reusable technical assets to implement tasks configured in the solution model.

According to a further aspect of the invention, a computer program product for generating a domain-specific software solution may include a computer readable storage medium having computer readable program code embodied therewith. The computer readable program code may include computer readable program code configured to receive a request for a solution model to accomplish one or more tasks. The computer readable program code may also include computer readable program code configured to select a domain model in response to the request for the solution model. The computer readable program code may also include computer readable program code configured to configure the solution model based on the selected domain model. The computer readable program code may additionally include computer readable program code configured to select a set of candidate technical assets for each task of the solution model. Each task has one or more requirements. The computer readable program code may additionally include computer readable program code configured to determine for each candidate technical asset of the set of candidate technical assets for each task if the one or more requirements of the task of the solution model are satisfiable by the candidate technical asset. The computer readable program code may also include computer readable program code configured to select a technical asset from the set of candidate technical assets for each task to be included in a solution implementation in response to the candidate technical asset satisfying the one or more requirements of the task of the solution model. The computer readable program code may further include computer readable program code configured to implement the solution in response to selecting the technical assets for each task of the solution model.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which.

DETAILED DESCRIPTION

Figure 1:
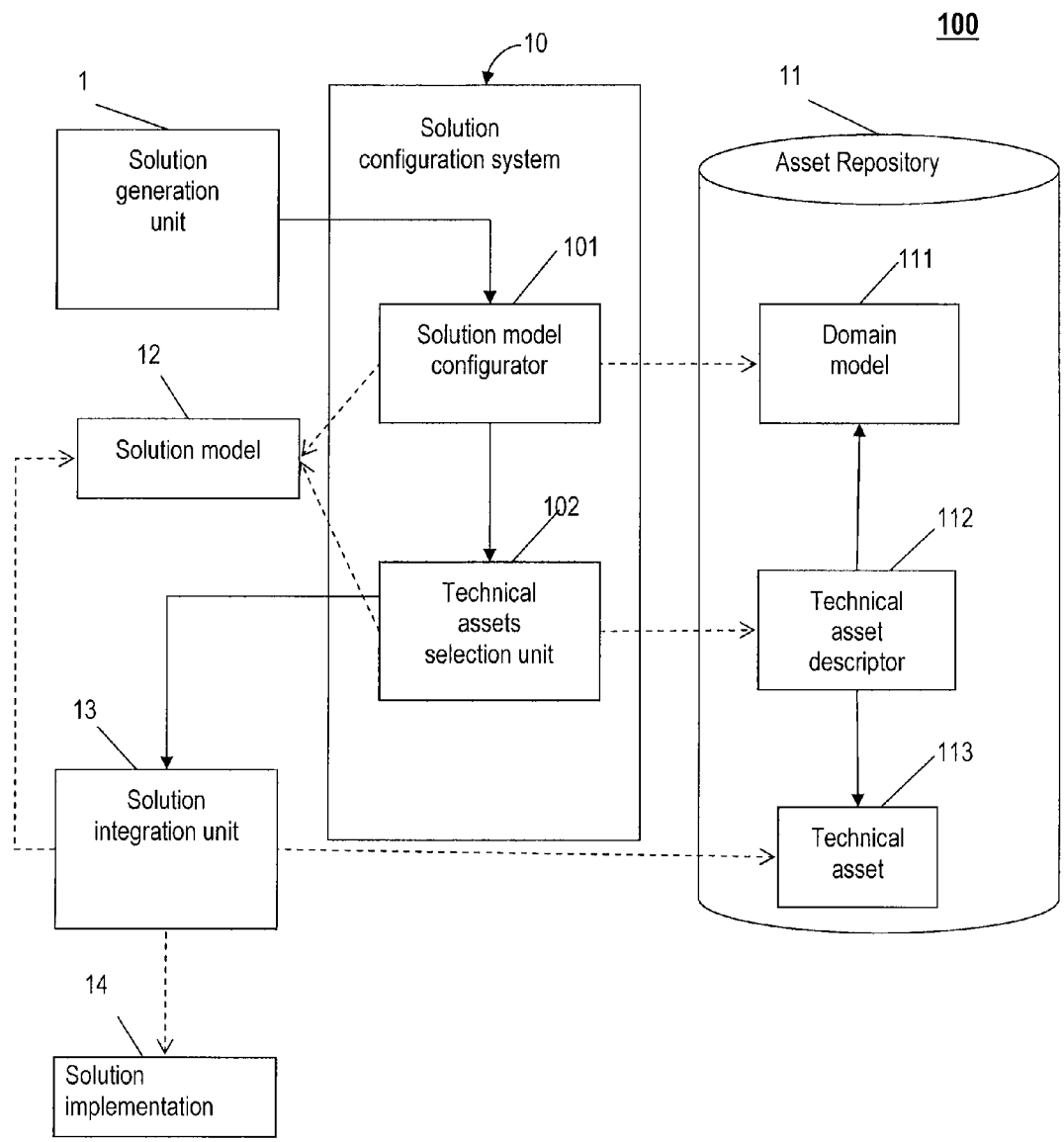
FIG. 1 schematically shows a solution generation system in accordance with certain embodiments of the invention.

FIG. 1 schematically shows a solution generation system 100 in accordance with certain embodiments of the invention. The solution generation system 100 comprises a solution configuration unit 10 for configuring solution models 12. The solution model 12 is used by a solution generation unit 1 to select reusable technical assets stored in an asset repository 11 to implement tasks configured in the solution model 12.

Tasks represent logical activity in a process. The process can be for example a batch process, like an automatic checking of the consistency of a data model, a process for solving a constraint satisfaction problem with respect to predefined goals, or a process provided to analyze data trends and forecasting evolution of these data. This may also be an interactive and collaborative process like visualizing and editing domain-specific data like production plans or routing scheduling. The tasks can be orchestrated into the process using any suitable management solution. Further, the invention applies to any type of task granularity.

The solution model 12 is created for a selected domain model 111.

In accordance with various embodiments of the invention, a domain model 111 is provided to capture knowledge data about an industry specific solution (e.g. car sequencing).

The solution model 12 and the domain model 111 comprise concepts classes, tasks classes, and requirements classes:
  the concepts class is associated with attributes and relationships (e.g. car configuration, demand, features, production sequence)
  the tasks class represents tasks to be achieved (e.g. check feasibility of manual planned sequence, improve sequencing with respect to predefined goals)
  the requirements class represents requirements covered by tasks, such as for example "cannot have more than x cars with a given features out of y consecutive cars" or "Minimize color changes in drawing tool".

The solution configuration system 10 includes a solution model configurator 101 for configuring a solution model 12 based on the selected domain model 111. The domain models may be stored in the asset repository 11.

The solution model configurator 101 may configure solution models 12 from user inputs received through a user interface associated with the solution model configurator 101 or automatically. The user interface can be dedicated to specific domain model. Alternatively, it can be independent of any domain model.

In accordance with various embodiments of the invention, reusable technical assets are indexed on the tasks classes defined in a given domain model 111. A technical asset selection unit 102 selects a set of technical assets eligible to implement tasks classes instantiated in the solution model 12 based on a domain model 111, using technical asset descriptors.

Each technical asset in the asset repository 11 is linked to a given domain model 111 and is associated with an asset descriptor 112.

An asset descriptor 112, associated with a given technical asset, defines what task classes declared in domain model 111 are implemented by the technical asset and what requirements are covered by the task classes. The asset descriptors may be stored in the asset repository or in any suitable storage location.

More specifically, an asset descriptor 112 comprises tasks classes representing the tasks implemented by the technical asset, requirements classes representing the requirements covered by the task classes. It may also comprise restrictions representing restrictions on the properties instantiated by the task classes.

A technical asset represents a component or an executable model that is provided to implement or support some task classes of a domain model 111. Exemplary technical assets comprise for instance:
- an optimization model implementing a feasibility checking task or a solution optimization task,
- a logical set of business rules implementing data checking, plan pre-processing or plan post-processing, or
- an interactive view implementing the edition of data with a structural pattern.

The technical asset selection unit 102 selects a set of candidate technical assets from the asset repository 11 for each task of the solution model 12 based on information maintained in the asset descriptors 112.

The solution model 12 generated by the configuration system 10 is then provided to an integration unit 13 to produce a solution 14 implementing the solution model 12 and integrating the selected technical assets in association with the corresponding tasks.

Figure 2:
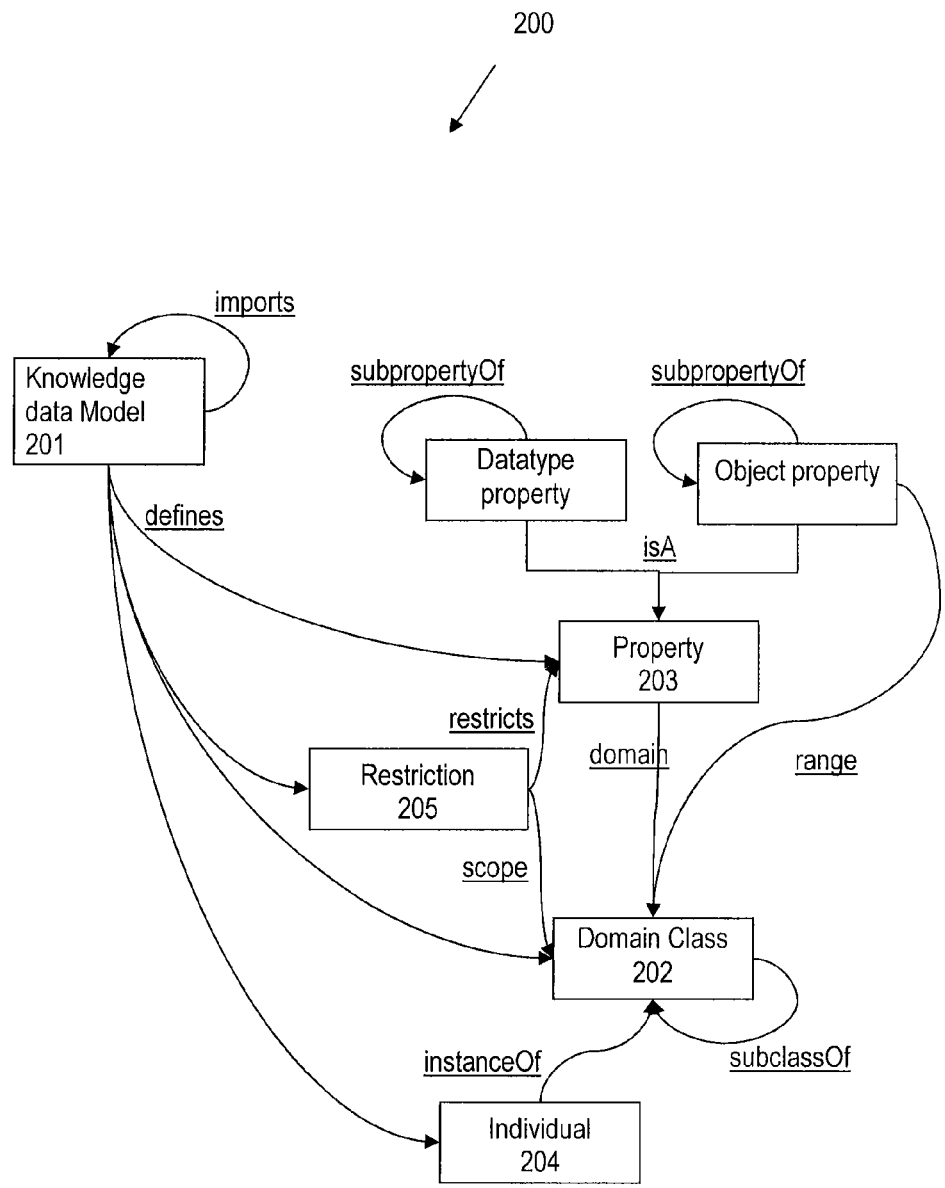
FIG. 2 schematically illustrates a knowledge data model used to define domain models, asset descriptors and solution models in accordance with certain embodiments of the invention.

FIG. 2 schematically illustrates the structure of the domain model 200 used to define domain models 111, solution models 12 and asset descriptors 112. In certain embodiments of the invention, the model data structure is based on OWL, the Ontology Web Language. However, skilled person will readily understand that the invention is not limited to the use of OWL, and can be based on any language suitable for representing domain knowledge data.

The domain model 200 comprises:
- Knowledge data Models 201, each knowledge data model defining a set of classes, properties, individuals, and restrictions. A given knowledge data model can import other knowledge data models, making their elements visible in the scope of this knowledge data model.
- Domain classes 202, each domain class defining a group of individuals that share common properties and relationship with other classes. Classes 202 can be organized in a specialization hierarchy using subClassOf. The domain classes 202 comprise a most general class named THING that represents the class of all individuals and is a super-class of all classes.
- Properties 203 representing properties which can be used to define relationships between individuals (Object properties) or from individuals to data values (Datatype properties). The scope of a property limits the individuals to which the property can be applied. If a property relates an individual to another individual, and the property has a class as one of its scopes, then the individual belong to the class. For simplicity, the expression "property of a class" will be used thereinafter to designate a property which contains the class in its scope. The range of a property limits the individuals that the property may have as its value. If a property relates an individual to another individual (Object property), and the property has a class as its range, then the other individual belong to the range class.
- Individuals 204 representing instances of classes; object properties may be used to relate one individual to another.
- Restrictions 205 representing constraints as regards the way a property can be used by instances of a class; an exemplary restriction may constrain the cardinality or the type of values of a property with respect to a particular class, so-called the scope of the restriction.

In the figures, properties 203 of the model data structure will be designated with an underlined name to distinguish them from the property of domain models 111, asset descriptor models 112, and solution models 12.

Figure 3:
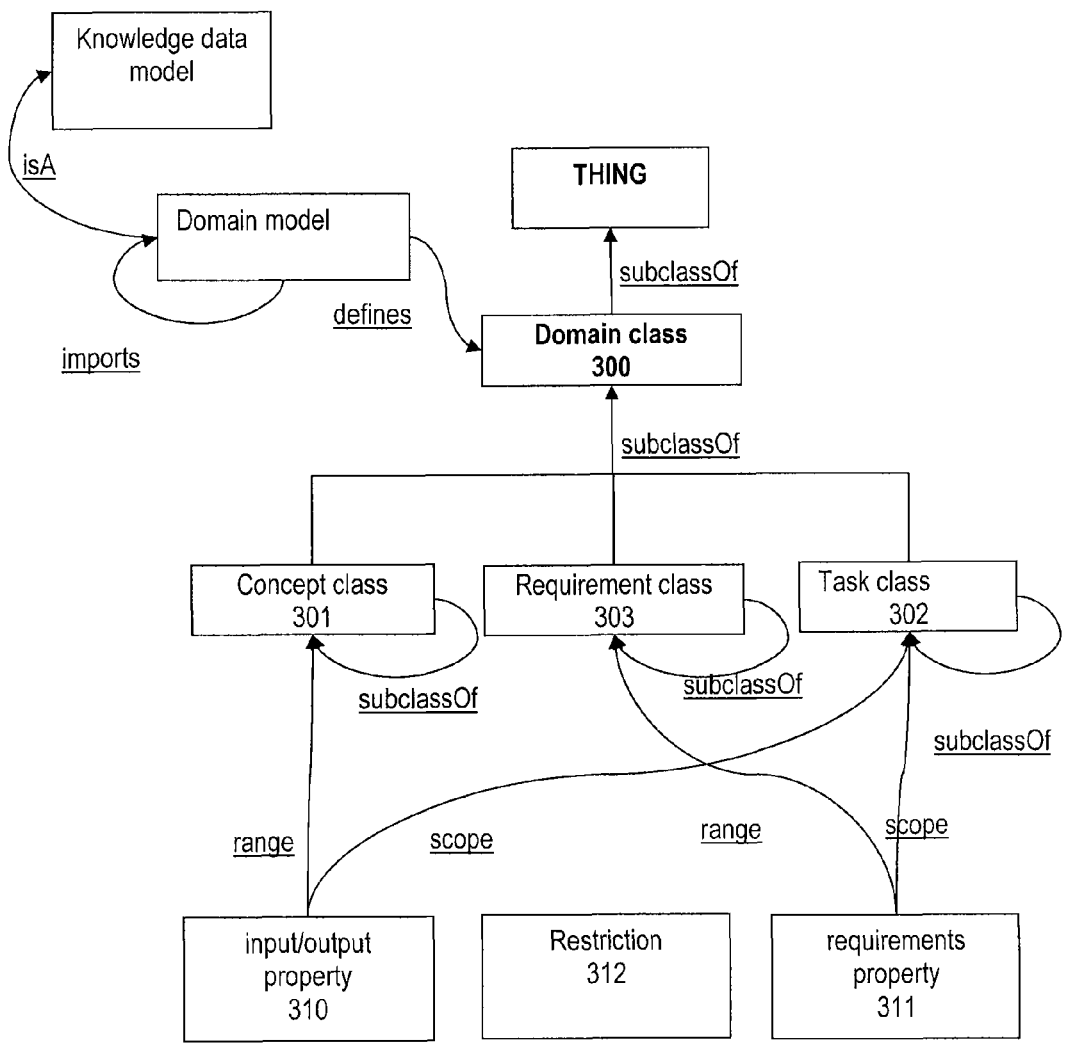
FIG. 3 schematically shows elements of a domain model.

FIG. 3 schematically shows the structure of a domain model 111. A domain model represents a knowledge data model which defines domain classes 300 as subclasses of THING, as well as some properties and restrictions.

Domain classes comprise three set of classes:
- Concept classes 301,
- Task classes 302, and
- Requirement classes 303.

A concept class 301 represents a logical set of entities of the domain that are required to perform some tasks. For instance a domain model for school timetabling will define concept classes for teachers, lessons, class groups. A concept class 301 can be a specialization (subclassOf relation) of another concept class, also called its parent concept class. A concept class defines properties like the duration of a lesson or the set of class groups attending a lesson.

Object properties of concept classes may be used to represent relationships between concept individuals. For instance the relationship existing between a lesson and the subject taught in this lesson. The domain and range of these object properties are concept classes. Data type properties of concept classes i.e. properties which domain is some concept classes and the range some predefined data types may be further used to define internal characteristics of concepts (e.g. as the duration of a lesson).

A task class 302 represents a category of tasks, like computation of a timetable, or interactive edition of a timetable. A task class 302 can be a specialization (subclassOf relation) of another task class, also called its parent task class. Task classes have the following predefined properties:
- an input/output property 310 defining the input (set of concept individuals which form the input data processed by the task) and output (set of concept individuals created or updated by the task) for this task. The value of the properties are concept classes 301 processed by the task. Its range is the concept classes 301. An input/output property 310 is associated with concept individuals or concept classes (as a set of individuals)

a requirements property 311 defining the requirements which applies to the task. The requirement property is associated with the requirement individuals that are expected to be satisfied in the execution of the task.

A task class may further comprise goals property defining the set of goal individuals to be covered by the task, and task parameters identifying data required to control the execution of a task, independently of input concepts For example, to generate scheduling and planning solutions, the domain model may include planning task classes that identify types of tasks that are to be executed to achieve a plan (e.g. input data checking, interactive edition of a timetable, feasibility check of a partial or complete timetable, or completion of a partial timetable optimizing some goals, etc.).

A requirement class 303 represents requirement individuals assigned to a task. A requirement individual may represent either a business requirement or a technical requirement. For instance in the computation of a school timetable, a technical requirement could express for example the fact that a teacher cannot be assigned to two lessons at the same time, and a business requirement could express the fact that the number of lesson slots in the same subject, assigned to a class group, cannot exceed a daily maximum. Each requirement individual belongs to a requirement class which holds its definition. A requirement class 303 can be a specialization of another requirement class (also called its parent requirement class).

A requirement class represent a specific type of requirements to be covered by tasks. A requirement applies on concept individuals and/or set of concept individuals associated with concept classes.

A requirement class may further comprise a weight property defining a weight (also referred to as individual requirement score) for the requirement class. It may be used during the execution of a task to arbitrate between conflicting requirements.

Each individual or class used by a requirement may be assigned a role in the requirement. Each role can be defined by an object property which domain contains the requirement class and which range contains some concept classes or data type.

The domain model data structure further comprises restrictions 312 representing restrictions on domain classes declared by a domain model. For instance a restriction can be declared to set the minimum cardinality of a property of a concept when assigned to a task.

Restrictions may be defined on roles. Restrictions comprise conditions on the individual or the class to which the role is assigned. For instance, a restriction can be defined on the maximal cardinality of a property of the individual or class. Concept individuals or classes which do not meet a role restriction will not be assigned to the role.

Figure 4:
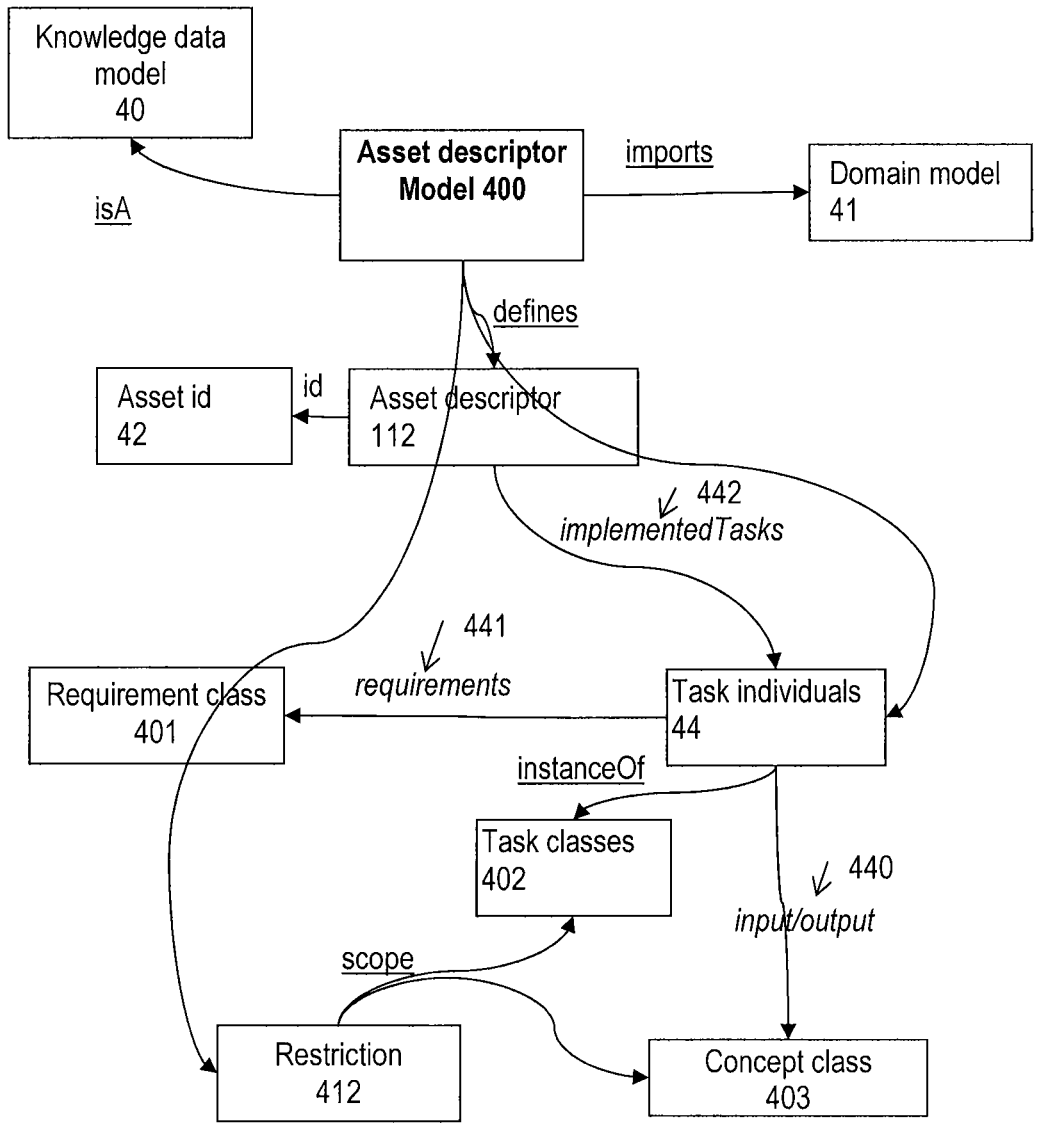
FIG. 4 schematically shows entities of an asset descriptor.

FIG. 4 schematically shows a technical asset descriptor model 400. Each technical asset registered in the asset repository 11 is associated with a technical asset descriptor 112. An asset descriptor 112 associated with a given technical asset comprises task individuals 44 identifying the tasks of a domain model which are implemented by the technical asset. Moreover, for each task implemented by the technical asset, the asset descriptor 112 comprises requirement classes 401 identifying the requirement classes which are covered by the technical asset either optionally or not. The asset descriptor models may be persisted, e.g. in the form of ontology files and maintained by an asset manager using dedicated tools.

An asset descriptor model 400 can be based on a knowledge data model 41 represented in FIG. 2. An asset descriptor data model can be viewed as a knowledge data model 40 which imports a knowledge data model 41. It defines an asset descriptor 112 as an individual.

The asset descriptor 112, as an individual comprises, an object property "implementedTasks" which is assigned with a list of tasks individuals 44 representing the tasks implemented by the technical asset.

Each task individual 44 associated with the implementedTasks property instantiates the following properties
- an input/output property 440 assigned to the concept classes 403 required as input/output of the implemented task,
- a requirements property 441 assigned to the set of requirement classes 401 which are covered by the asset,
- a implementedBy property 442 assigned to the identifier 42 of the technical asset which will be selected to implement the task. This property is assigned during the technical asset selection (described thereinafter with reference to FIGS. 7 and 8).

The properties 440, 441 and 442 are maintained with other values in the persistence form of the asset descriptor model. These values may be initially inputted by the user during the creation of the asset descriptor model.

An asset descriptor model may define a set of restrictions 412 on these predefined properties or on specific property of concept classes. Exemplary restrictions 112 comprise the following:
- absence of some types of concepts in input/output (restriction of input/output range),
- optional or non-optional concepts in input/output (minimal cardinality restrictions),
- absence of properties of input/output concept classes (maximal cardinality restricted to zero),
- absence of some types of requirements (restriction of requirements range), or
- optional or non-optional requirements (min cardinality restrictions).

Figure 5:
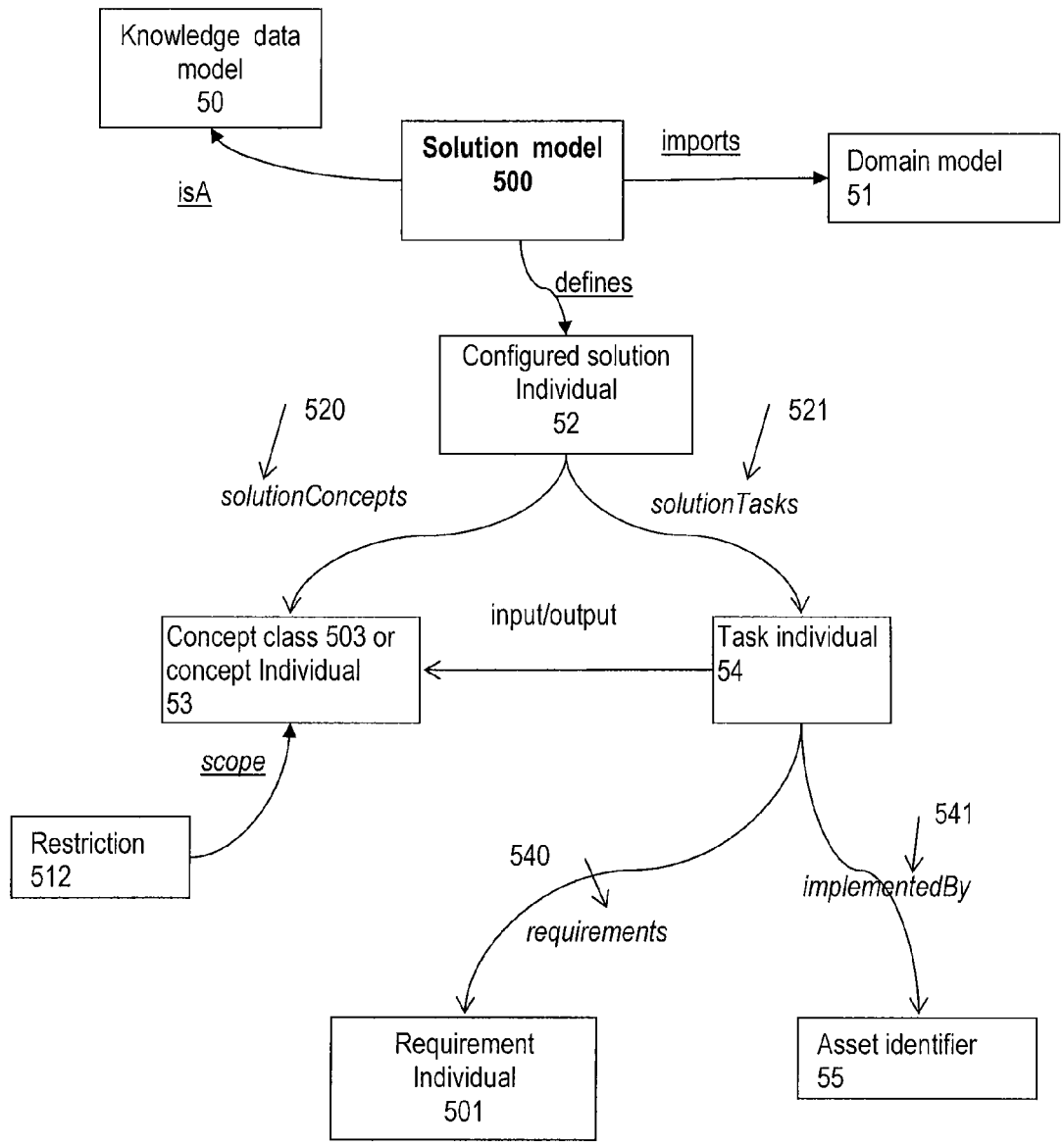
FIG. 5 schematically shows entities of a solution model.

FIG. 5 schematically shows the structure of a solution model 500 and the associated properties. A solution model 500 represents a knowledge data model 50 that imports a domain model 51. It defines a configured solution 52 as an individual with a solution concepts property related to concept individuals 503 or concept classes 53 restricted by restriction 512 and designated as solutionConcepts 520 and a solution tasks property related to task individuals 54, designated as solutionTasks 521.

The first property solutionConcepts 520 is associated with concept individuals or concept classes 503. The property solutionTasks 521 is associated with task individuals 54. Configuration of solution concepts and solution tasks will be described thereinafter with reference to FIG. 6.

Task individuals 54 are associated with a requirements property 540. The requirements property 540 is assigned to a set of values of several requirement individuals 501 instantiated from the requirement class which this task satisfies. It also comprises an implementedBy property 541 assigned to an individual of asset identifier 55, which is the unique identifier of a technical asset 42.

Figure 6:
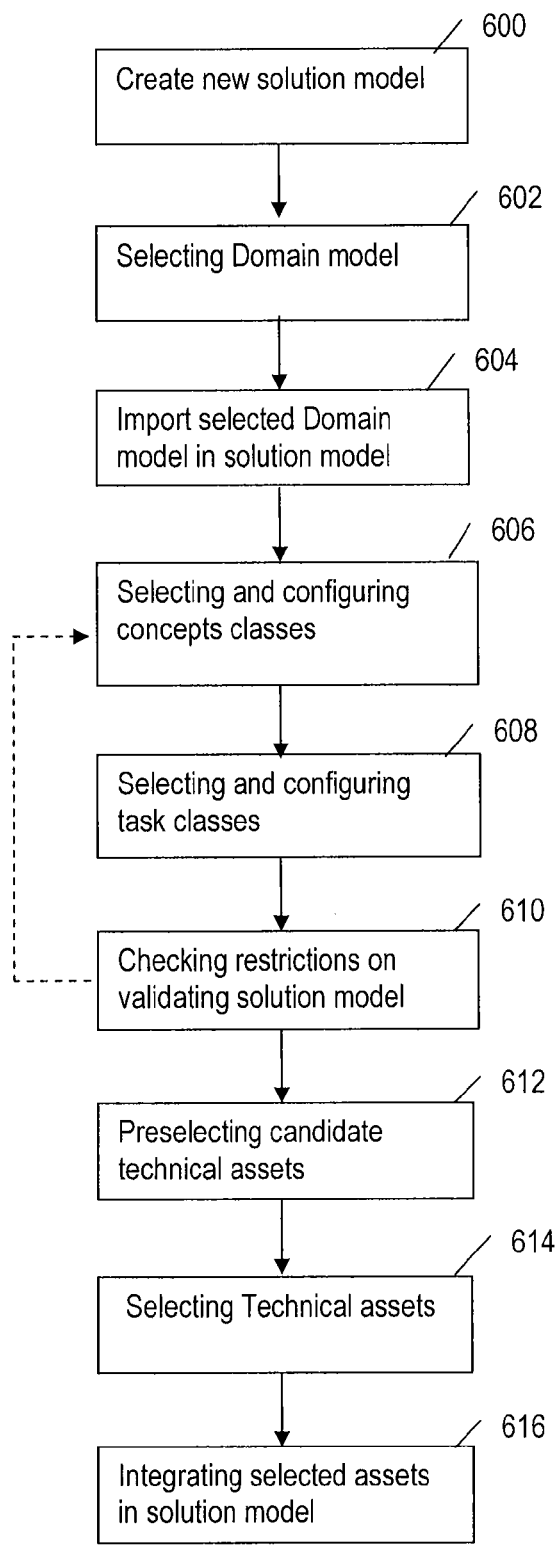
FIG. 6 is a flowchart for configuring a solution model in accordance with embodiments of the invention.

FIG. 6 is a flowchart for configuring a solution model in accordance with certain embodiments of the invention.

In step 600, a new solution model 12 is created in response to a request from a user. The solution model may be created from a predefined solution template.

In step 602, a domain model 111 is selected among the domain models stored in the asset repository 11. The domain model 111 may be selected interactively through a user interface exposing the list of domain models pre-defined in the asset repository 11. Alternatively, the domain model may be selected automatically, for instance when the solution generation system is dedicated to a single domain model.

In step 604, the selected domain model 111 is imported in the new solution model 12.

In step 606, solution model concepts are selected and configured. The solution Concepts property of the created solution individual is assigned with concept individuals 52 or concept classes 503. The solution concepts are then configured in order to associate them with concept classes 503, concept individuals 53, restrictions 512 with respect to the concept classes, and properties. The configuration of solution concepts may include the following steps, for example:

- defining new concept classes 503, specializing existing concept classes of the domain model or THING,
- creating concept individuals 53,
- defining a restriction with respect to the concept classes to ignoring some properties in concept classes (e.g setting the property cardinality to 0),
- adding properties to concept classes, and
- defining other restrictions with respect to concept classes 503 and in relation with property cardinality or property range.

In step 608, solution model tasks are selected and configured. The tasks may be selected based on user inputs received through a user interface. Step 610 comprises associating the solution Tasks property of the solution individual 52 with tasks individuals 54. The solution tasks may be then configured according to the following steps:

- creation of the Task individuals 54,
- association of the Input/output property of task individuals 54 with the concept individuals 53 or concept classes 503 which are assigned to solution Concepts property, and
- association of the Requirements property of task individuals 54 with requirement individuals 501.

If the selection of some requirements 501 involves an update of concept classes 503 or properties to comply with restrictions 512 defined in the domain model, step 608 of selecting solution concepts can be repeated.

Step 606 checks the restrictions 312 and 512 which apply to tasks of the concepts that have been configured with respect to property range and cardinality. If some restrictions 512 do not apply, the process reverts to step 608 of selecting and configuring solution concepts. Otherwise, the solution model is validated, and the technical assets selection is started in step 614.

Step 612 preselects technical assets eligible from the asset repository 11 to implement each task of the solution model.

Step 614 selects a technical asset among said eligible technical assets to implement each solution task.

Step 616 integrates the selected assets to implement the associated solution tasks.

Figure 7:
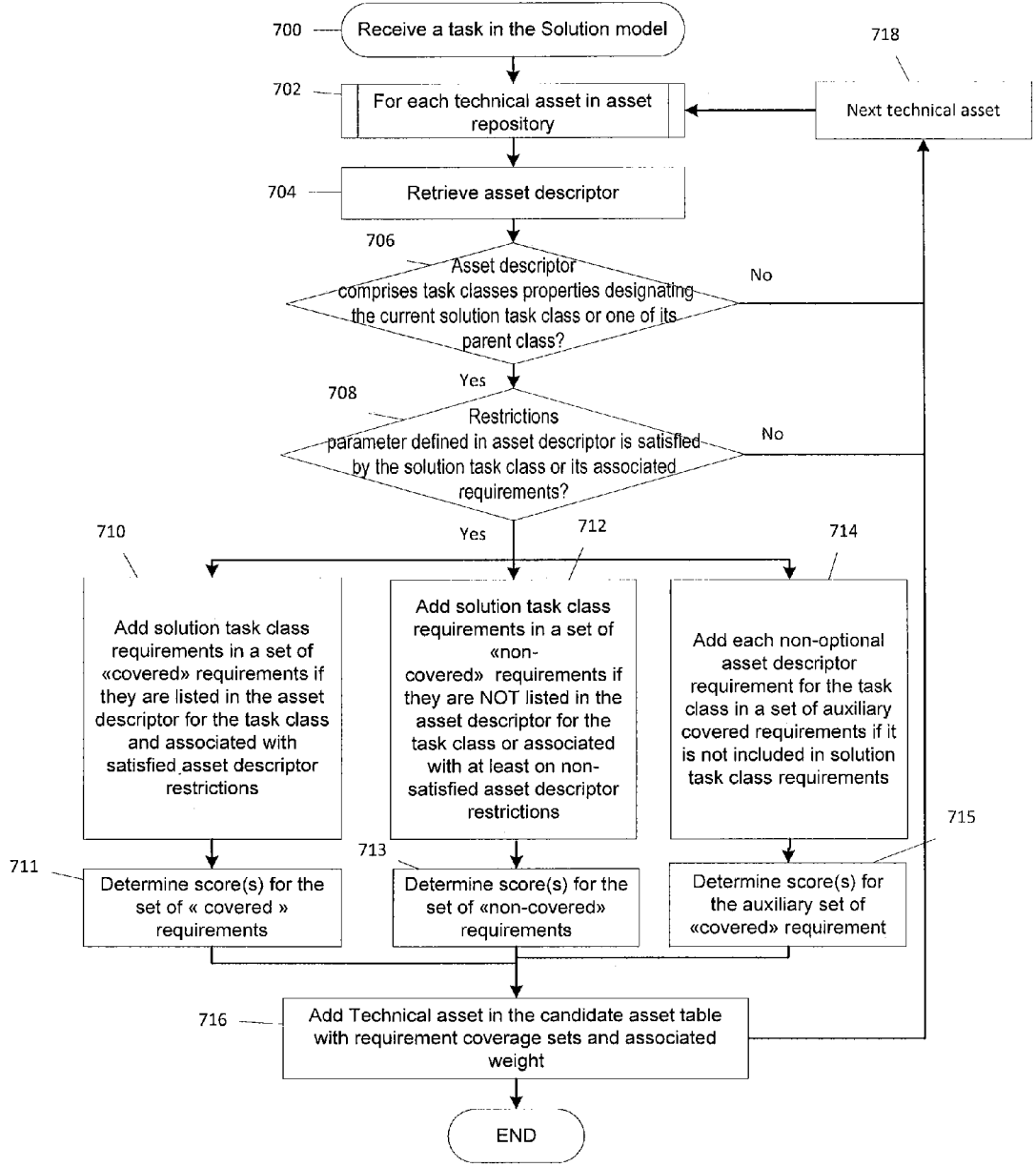
FIG. 7 is a flowchart for pre-selecting a set of technical asset for task classes instantiated in the solution model.

FIG. 7 is a flowchart illustrating the steps performed to pre-select technical asset candidates for the solution tasks of the solution model (step 614 of FIG. 6).

In step 700, a set of technical assets 113 eligible to implement a task individual 54 of the solution model 500 is automatically determined for each solution task in 54.

For the current solution task representing a task individual 54, the technical asset selection unit 102 will determine a set of candidate technical assets 113 from the asset repository 11 that are eligible to implement that solution task based on the asset descriptor.

More specifically, to determine if a technical asset is eligible to implement a solution task, the technical asset selection unit 102 retrieves for each technical asset (step 702) in the asset repository 11 the asset descriptor 112, in step 704, and then determines if predefined conditions related to the solution task properties and/or classes are satisfied using the asset descriptor associated with the technical asset. The condition checking steps comprise in particular:

In step 706, determining if the property 442 "implementedTasks" of asset descriptor 112 related to the tasks implemented by the asset comprises a task individual 44 which class (also designated as concrete implementation class) is the class or a parent class of the current solution task 54 to implement;

if the condition of step 706 is satisfied, further determining in step 708 if the restrictions 412 defined in the asset descriptor 112 are enforced by the current solution task 54 and by its input/output concepts 503.

If the current technical asset 113 satisfies the predefined conditions of step 706 and 708, the technical asset selection unit 102 further determines requirement coverage sets for the eligible technical asset (also referred to as requirements sets). The requirement coverage of each eligible asset is determined by comparing the list of requirement individuals 501 for the current task in the solution model 12 and the list of requirement individuals instantiated from class 401 for the eligible asset in the asset descriptor model 112.

A requirement 501 of the current solution task 54 is covered by an implemented task (44) of an eligible technical asset:

- if its requirement class appears in the requirements property 441 of the task individual (44), or
- if its requirement class has a parent requirement class covered by the implemented task (44).

The coverage of the requirements by the eligible asset is thereby defined by the following data sets:

- a first set representing the "covered requirements" determined in step 710: this set comprises the set of requirements assigned to the solution task (501) which are covered by the implemented task (44);
- a second set representing uncovered requirements in step 712: this set comprises the set of requirements assigned to the solution task (501) which are covered by the implemented task (44); and
- a third set representing auxiliary covered requirements in step 714: this set comprises the set of requirements which are not assigned to the solution task but defined as non-optional requirements of the implemented task (44)

In step 711, 713 and 715, a score is associated to each one of the three sets of requirements coverage determined for the eligible technical asset. A task score may be further computed for the task from the scores determined for the sets of requirements coverage.

To facilitate understanding of this embodiment of the present invention, there follows notations used thereinafter in the specification:

- "S-Task" will be used to designate the score of a task in association with a technical asset eligible for this task,
- "S-CR score" will be used to designate the score of the covered requirements set defined for a task in the solution model and a technical asset eligible for this task,
- "S-UCR score" will be used to designate the score of the uncovered requirements set defined for a given task in the solution model and a technical asset eligible for this task, eligible for this task,
- "S-ACR score"" will be used to designate the score of the set of covered requirements defined for a given task in the solution model and a technical asset eligible for this task, The score of each requirements coverage set (S-CR score, S-UCR score, S-ACR score) is determined from the information related to the requirements identified in the requirement coverage set. In particular, the score may be determined from the size of the requirements coverage set (number of requirements identified in the requirements coverage set). The scores S-CR, S-UCR and S-ACR may be further determined based on individual requirement weights associated with each requirement. The requirements weights may be determined for the requirements based on different factors such as the technical difficulty to implement the requirement or the importance of the requirement with respect to the targeted solution.

In accordance with certain embodiments of the invention:
The score S-CR of the covered requirements set associated with the current task of the solution model 12 (step 711) is computed by multiplying the percentage of the requirements number of covered requirements set against the total requirements for the current task in solution model by a factor 10.
The score S-UCR of the uncovered requirements set is then determined as the negative of the computation result obtained for S-CR (step 715).
The score S-ACR of the set of covered requirements defined for the current task in the solution model is computed by multiplying the percentage of the requirements number of the auxiliary set of covered requirements against the total requirements for the current technical asset by a factor 10,
The score S-Task of the task in association with the asset identifier is determined as follows:

$$S\text{-Task} = S\text{-CR} + S\text{-UCR} + S\text{-ACR}$$

For each task of the solution model, the eligible technical assets may be ordered according to their respective task score S-Task. If several eligible technical assets have the same score S-Task, then the assets may be re-ordered according to their respective score of S-CR. If several eligible technical assets have the same score S-CR then the asset may be reordered again according to their respective score S-UCR. If several eligible technical assets have the same score S-UCR, the assets may be reordered according to their respective score S-ACR. If still eligible technical assets have the same score S-ACR, the eligible assets may be re-ordered by asset identifier.

The technical selection unit 102 will select the technical assets to implement tasks of the solution model among the set of candidate technical assets preselected in steps 700 to 718, and based on their respective task scores.

Turning back to FIG. 7, in step 716, the information related to the three sets of requirement coverage sets are stored in an eligible asset data structure associated with each solution task. This eligible asset data structure comprises an entry for each eligible asset. For each asset entry, it comprises information associated with the requirements coverage set. The information maintained for each requirements coverage set may comprise a list of requirement identifiers identifying the requirements comprised in said requirement coverage set, requirement weights associated with said requirement identifiers, a requirement coverage set score associated with the requirement coverage set, and a task score associated with the solution task.

In step 718, the next technical asset in the asset repository 11 is processed by repeating steps 700 to 716, if it is determined that not all the technical assets have been processed. Step 718 is also performed if one of the conditions of steps 706 and 708 fails.

If all technical assets have been processed), the processing is ended and the next solution task in the solution model 12 can be processed according to the method of FIG. 7.

When all the solution tasks of the solution model 12 have been processed, the technical assets pre-selection phase is terminated This pre-selection phase provides for each task of the solution model 12, a set of candidate technical assets with respective task scores, and for each of candidate technical asset information related to the three sets of requirement coverage. The information related to the candidate technical assets is maintained in the candidate assets data structure.

The selection of a unique technical asset among the candidate technical assets for a given solution task, is performed by the technical selection unit 102.

In certain embodiments of the invention, the technical selection unit 102 may select the candidate asset having the best task score to implement the corresponding task of the solution model based on the information maintained in the technical asset data structure. Other information associated with the technical asset may be used by the selection unit 102 such as the number of time a technical asset has been reused or information about asset quality and scalability.

Alternatively, the selection unit 102 may expose to the user the information associated with each candidate technical asset as determined in the pre-selection phase and with the three requirement coverage sets obtained for the technical assets, such as the scores. This information may be retrieved from the technical assets data structure.

Figure 8:
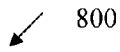
FIG. 8 schematically shows a technical asset data structure, according to certain embodiments of the invention.

FIG. 8 shows an exemplary eligible asset data structure 800 associated with a given task of the solution model, in accordance with certain embodiments of the invention.

The requirements associated with each requirements coverage set are represented with a notation of the type "Req1", "Req2", . . . , "Reqn".

The eligible asset data structure 800 shown in FIG. 8 is a table comprising a row for each eligible asset of the solution model (e.g Asset_x, Asset_y), and three main columns respectively for the covered requirement set 80, the uncovered requirement set 81 and the auxiliary covered requirement set 82. Each column related to a coverage requirement set (80, 81 and 82) is itself dividing into two columns:
the first column designated by "id" provides the list of requirement identifiers belonging to each requirement coverage set (for example, requirement Req1 and Req2 for covered requirement set 80), and
the second column designated by "Score" provides the weight determined for each requirement of the set and in bold the score of the requirement coverage set (S-CR or S-UCR or S-ACR).

The eligible asset data structure 800 further comprises a column 83 providing the task score (S_Task) determined for each eligible asset. For example, the task score for Asset_x1 is equal to 9 and the task score for Asset_y is equal to 15 according to the application of previous equation for S-Task:

$$S\text{-Task}(Asset\_x) = 19 + -8 + -2 = 9$$

$$S\text{-Task}(Asset\_y) = 21 + -6 + 0 = 15$$

In this example, the auxiliary covered requirements set has been assigned a negative score S-ACR to take into account the fact that requirement Req8 is expected to decrease the quality of the expected solution. The skilled person will readily understand that the requirements coverage sets may be assigned positive or negative scores depending on the application of the invention. In particular, a positive score may be assigned to the auxiliary covered requirements set in certain embodiments of the invention to allow future evolution of the system Accordingly, each solution task in the solution model 12 is associated with at most one technical asset that will implement the task. The solution model 12 is then complete and can be transmitted to the integration unit 13 which will integrate the selected technical assets in the implementation of the solution.

The solution generation system according to the various embodiments of the invention allows indexation of technical assets with respect to the task(s) it implements and the requirements it covers, and automatic and transparent selection of technical assets to implement the solution model tasks.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method for generating a domain-specific software solution comprising:
   providing a plurality of domain models stored in an asset repository, each domain model comprising a set of task classes each associated with one or more respective tasks and a set of requirement classes each defining one or more requirements associated with said respective tasks;
   providing a plurality of technical assets associated with each domain model, each technical asset being associated with an asset descriptor identifying at least one task class and at least one requirement class associated with the at least one task class of said associated domain model;
   providing a solution model for a given domain model, the given domain model being selected from the plurality of said domain models stored in the asset repository, said solution model comprising the set of task classes of said given domain model and the set of requirement classes associated with said set of task classes in said given domain model;
   for each task class in the solution model, preselecting candidate technical assets associated with said given domain model if said task class or a parent class of said task class is identified in a respective asset descriptor associated with each technical asset;
   for each candidate technical asset preselected for a task class, determining at least one requirements set identifying one or more requirements based on conditions related to the one or more requirements associated with said task class in the asset descriptor and the one or more requirements associated with said task in the solution model; and
   selecting one of the candidate technical assets among said candidate technical assets preselected for a task of said solution model to implement said task based on the at least one requirements set determined for each of the candidate technical assets.

2. The method of claim 1, wherein said preselecting step further comprises determining a score for each requirements set, and wherein said selecting step comprises selecting the candidate technical asset to implement the task of said solution model from the scores determined for the requirements sets of each candidate technical asset.

3. The method of claim 2, wherein the score of each requirements set is determined from the number of requirements belonging to the requirements set.

4. The method of claim 2, wherein the score of each requirements set is determined from an individual score associated with each requirement belonging to the requirements set.

5. The method of claim 2, wherein said preselecting step further comprises for each candidate technical asset preselected for a given task of the solution model, calculating a task score for the task from the scores calculated for each requirements set associated with said technical asset.

6. The method of claim 5, wherein said task score is calculated by summing the scores of each requirements set.

7. The method of claim 1, wherein each domain model further comprises at least one concept class, each concept class designating one or more concept entities required to perform one of the tasks among the tasks associated with said task classes.

8. The method of claim 7, wherein each asset descriptor associated with each technical asset comprises a task property associated with a list of task individuals identifying the tasks implemented by said technical asset and for each task individual identifying a requirement property identifying the requirements covered by the task.

9. The method of claim 1, wherein the solution model further comprises one or more concept classes and properties, said properties including:
   a solution concepts property related to one or more concept individuals of said concept classes or to said concept classes; and a solution task property related to one or more task individuals in said solution model, each task individual being associated with a requirement property designating a set of values for requirement individuals instantiated from the requirement class which the task satisfies and each task individual being associated with an implementation information property designating an technical asset identifier selected to implement the task.

10. The method of claim 9, wherein each task individual instantiates an input/output property identifying one or more concept classes related to one or more concept entities required as input/output of the implemented task.

11. The method of claim 1, wherein said step of determining said at least one requirements set comprises comparing a list of requirements assigned to said task in the solution model and a list of requirements defined for said task class in said asset descriptor.

12. The method of claim 1, wherein said step of determining said at least one requirements set comprises:
adding a requirement assigned to said task in a set of covered requirements if said requirement is included in the requirements defined for said task class in said asset descriptor;
adding a requirement assigned to said task in a set of uncovered requirements if said requirement is not included in the requirements defined for said task class in said asset descriptor; and
adding a requirement that is not assigned to said task in a set of auxiliary covered requirements if said requirement is included in the requirements defined for said task class in said asset descriptor.

13. A method for generating a domain-specific software solution, comprising:
receiving, by a processor, a request for a solution model to accomplish one or more tasks;
selecting, by the processor, a domain model in response to the request for the solution model, the domain model being selected from a plurality of domain models stored in a repository;
configuring, by the processor, the solution model based on the selected domain model, wherein configuring the solution model comprises:
selecting a set of candidate technical assets for each task of the solution model, wherein each task has one or more requirements;
determining for each candidate technical asset of the set of candidate technical assets for each task if the one or more requirements of the task of the solution model are satisfiable by the candidate technical asset;
selecting a technical asset from the set of candidate technical assets for each task to be included in a solution implementation in response to the candidate technical asset satisfying the one or more requirements of the task of the solution model; and
implementing, by the processor, the solution in response to selecting the technical assets for each task of the solution model.

14. The method of claim 13, further comprising determining a score for each requirement satisfied by the selected technical asset.

15. The method of claim 14, further comprising determining a task score associated with each selected technical asset by summing the score for each requirement, wherein each requirement is one of a covered requirement, an uncovered requirement and an auxiliary covered requirement.

16. The method of claim 15, further comprising selecting the technical asset having a highest task score to implement a corresponding task of the solution model.

17. A system for generating a domain-specific software solution, comprising:
a processor;
a repository for storing a plurality of domain models associated with the processor;
a solution model configurator operable on the processor, wherein the solution model configurator configures a solution model based on a selected domain model;
a plurality of reusable technical assets stored on the repository, wherein each reusable technical asset is adapted to satisfy one or more requirements of an associated task of the domain model; and
a solution generation unit to select reusable technical assets from the plurality of reusable technical assets to implement tasks configured in the solution model, wherein a set candidate technical assets for each task of the solution model are preselected from the plurality of reusable technical assets in response to the associated task of the domain model being identified in a respective asset descriptor for each candidate technical asset.

18. The system of claim 17, further comprising:
a module to select the set of candidate technical assets for each task of the solution model from the plurality of reusable technical assets, wherein each task of the solution model has one or more requirements;
a module to determine for each candidate technical asset of the set of candidate technical assets for each task if the one or more requirements of the task of the solution model are satisfiable by the candidate technical asset;
a module to select a technical asset from the set of candidate technical assets for each task to be included in a solution implementation in response to the candidate technical asset satisfying the one or more requirements of the task of the solution model; and
a module to implement the solution in response to selecting the technical assets for each task of the solution model.

19. The system of claim 17, further comprising:
a technical asset selection unit to select a set of candidate technical assets for each task of the solution model based on information maintained in an asset descriptor; and
a solution integration unit to generate a solution and integrate the selected technical assets in association with corresponding tasks.

20. A computer program product for generating a domain-specific software solution, the computer program product comprising:
a computer readable storage medium having computer readable program code embodied therewith, the computer readable program code comprising:
computer readable program code configured to receive a request for a solution model to accomplish one or more tasks;
computer readable program code configured to select a domain model in response to the request for the solution model, the domain model being selected from a plurality of domain models stored in a repository;
computer readable program code configured to configure the solution model based on the selected domain model;
computer readable program code configured to select a set of candidate technical assets for each task of the solution model, wherein each task has one or more requirements;
computer readable program code configured to determine for each candidate technical asset of the set of candidate technical assets for each task if the one or more requirements of the task of the solution model are satisfiable by the candidate technical asset;

computer readable program code configured to select a technical asset from the set of candidate technical assets for each task to be included in a solution implementation in response to the candidate technical asset satisfying the one or more requirements of the task of the solution model; and computer readable program code configured to implement the solution in response to selecting the technical assets for each task of the solution model.

* * * * *